United States Patent
Williams et al.

(10) Patent No.: US 10,277,155 B2
(45) Date of Patent: Apr. 30, 2019

(54) SMART DC POWER SUPPLY FOR AC EQUIPMENT

(71) Applicant: EMERSON ELECTRIC CO., St. Louis, MO (US)

(72) Inventors: Matthew A Williams, Bridgeton, MO (US); Alex J Wall, St. Louis, MO (US); Jason Hill, St. Louis, MO (US); Thomas E Fogarty, Jr., Alton, IL (US)

(73) Assignee: Emerson Electric Co., St. Louis, MO (US)

( * ) Notice: Subject to any disclaimer, the term of this patent is extended or adjusted under 35 U.S.C. 154(b) by 508 days.

(21) Appl. No.: 14/862,630

(22) Filed: Sep. 23, 2015

(65) Prior Publication Data

US 2016/0233810 A1 Aug. 11, 2016

Related U.S. Application Data

(60) Provisional application No. 62/053,797, filed on Sep. 23, 2014.

(51) Int. Cl.

| | |
|---|---|
| *H01H 47/00* | (2006.01) |
| *H01H 35/00* | (2006.01) |
| *H01H 83/18* | (2006.01) |
| *H02H 3/02* | (2006.01) |
| *H02H 3/42* | (2006.01) |
| *H02P 25/14* | (2006.01) |
| *G06Q 30/00* | (2012.01) |
| *A47L 9/28* | (2006.01) |
| *H02J 7/00* | (2006.01) |
| *H02J 9/00* | (2006.01) |

(52) U.S. Cl.
CPC ............ *H02P 25/14* (2013.01); *A47L 9/2868* (2013.01); *A47L 9/2878* (2013.01); *G06Q 30/00* (2013.01); *H02J 7/0027* (2013.01); *H02J 7/0042* (2013.01); *H02J 9/005* (2013.01)

(58) Field of Classification Search
CPC ........ G06Q 50/00; G06Q 30/04; G06Q 30/00; H02J 7/0052; H02J 7/00; H02J 4/00; H02J 9/005; H02J 9/00; B60L 11/18; G07C 9/00
USPC ........... 307/126, 9.1, 31; 320/109, 107, 162, 320/128; 235/379; 701/22; 439/133, 439/188; 702/62
See application file for complete search history.

(56) References Cited

U.S. PATENT DOCUMENTS

| | | | |
|---|---|---|---|
| 4,835,409 A | 5/1989 | Bhagwat et al. | |
| 5,629,981 A * | 5/1997 | Nerlikar | ............... G06K 7/0008 340/10.31 |
| 6,448,732 B1 | 9/2002 | Block | |
| 8,146,199 B2 | 4/2012 | Yoo et al. | |
| 2007/0030715 A1* | 2/2007 | Manolescu | ........... H02M 3/157 363/84 |

(Continued)

*Primary Examiner* — Fritz M Fleming
*Assistant Examiner* — Jagdeep S Dhillon
(74) *Attorney, Agent, or Firm* — Armstrong Teasdale LLP

(57) ABSTRACT

A system is disclosed comprising a DC power supply for supplying DC power to a device having a universal electric motor configured to operate on AC power. The system is configured to have a first authorization component associated with the device and second authorization component associated with the DC power supply so that DC power is supplied to device, or is continued to be supplied to the device, only when the first and second authorization components operatively engage.

27 Claims, 7 Drawing Sheets

(56) References Cited

U.S. PATENT DOCUMENTS

| | | | |
|---|---|---|---|
| 2009/0091211 A1 | 4/2009 | Huan et al. | |
| 2009/0192927 A1* | 7/2009 | Berg | G06Q 30/04 705/34 |
| 2009/0275940 A1* | 11/2009 | Malackowski | A61B 18/1442 606/42 |
| 2010/0015847 A1* | 1/2010 | Jacks | H01R 13/641 439/490 |
| 2010/0145540 A1* | 6/2010 | McKenna | G07F 15/005 700/295 |
| 2011/0043327 A1* | 2/2011 | Baarman | H02J 7/025 340/5.8 |
| 2011/0058288 A1* | 3/2011 | Vanko | B25F 5/00 361/33 |
| 2011/0202213 A1* | 8/2011 | Rosendahl | B60L 11/1824 701/22 |
| 2011/0202214 A1* | 8/2011 | Rosendahl | B60L 1/04 701/22 |
| 2011/0298312 A1 | 12/2011 | Freakes | |
| 2012/0145782 A1* | 6/2012 | Ma | G07F 19/207 235/379 |
| 2013/0234645 A1* | 9/2013 | Goei | H02J 7/0052 320/101 |
| 2013/0314094 A1* | 11/2013 | Farmer | G01N 25/20 324/430 |
| 2013/0316198 A1* | 11/2013 | Bandhauer | G08C 17/02 429/50 |
| 2014/0009112 A1* | 1/2014 | Fontana | B60L 11/1827 320/109 |
| 2014/0028089 A1* | 1/2014 | Luke | B60L 1/003 307/9.1 |
| 2014/0028267 A1* | 1/2014 | Lee | H02J 7/0052 320/152 |
| 2014/0062396 A1* | 3/2014 | Reddy | H01M 10/44 320/109 |
| 2014/0285318 A1* | 9/2014 | Audeon | G07C 9/00111 340/5.61 |
| 2015/0022001 A1* | 1/2015 | Goei | H02J 7/0068 307/65 |
| 2015/0217656 A1* | 8/2015 | Loftus | H02J 7/0065 320/136 |

* cited by examiner

SMART DC POWER SUPPLY FOR AC EQUIPMENT

CROSS REFERENCE TO RELATED APPLICATIONS

This application is a non-provisional, and claims priority, of provisional application Ser. No. 62/053,797, filed Sep. 23, 2014, entitled "SMART DC POWER SUPPLY FOR AC EQUIPMENT", the entirety of which is incorporated herein by specific reference.

STATEMENT REGARDING FEDERALLY SPONSORED RESEARCH OR DEVELOPMENT

Not applicable.

REFERENCE TO APPENDIX

Not Applicable.

BACKGROUND OF THE INVENTION

Field of the Invention

The inventions disclosed and taught herein relate generally to direct current power supplies; and more specifically related to smart direct current supplies for driving AC equipment Description of the Related Art It is known that certain electric motors, typically referred to as "universal" motors, can operate on either direct current power (DC) or alternating current power (AC). Universal electric motors are also referred to as AC series motor, and are typically configured as commutated, series-wound motors in which the stator coils are connected in series with the rotor windings through a commutator.

Because of their high starting torque, low weight and small size, universal electric motors are commonly used in portable power tools, such as drills, and equipment, such as, wet/dry vacuums. Most often, these motors are wired for AC power. If AC power is not available, these AC wired equipment is rendered effectively useless.

The inventions disclosed and taught herein are directed to smart DC power supplies that can be used to power equipment having AC configured universal motors.

BRIEF SUMMARY OF THE INVENTION

The objects described above and other advantages and features of the invention are incorporated in the application as set forth herein, and the associated appendices and drawings, related to systems for power supplies for AC powered household devices and tools, such as wet/dry vacuums.

In accordance with a first embodiment of the present disclosure, a DC power supply for supplying DC power to a device having a universal electric motor configured to operate on AC power is disclosed. The system is configured to have a first authorization component associated with the device and second authorization component associated with the DC power supply so that DC power is supplied to device, or is continued to be supplied to the device, only when the first and second authorization components operatively engage.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
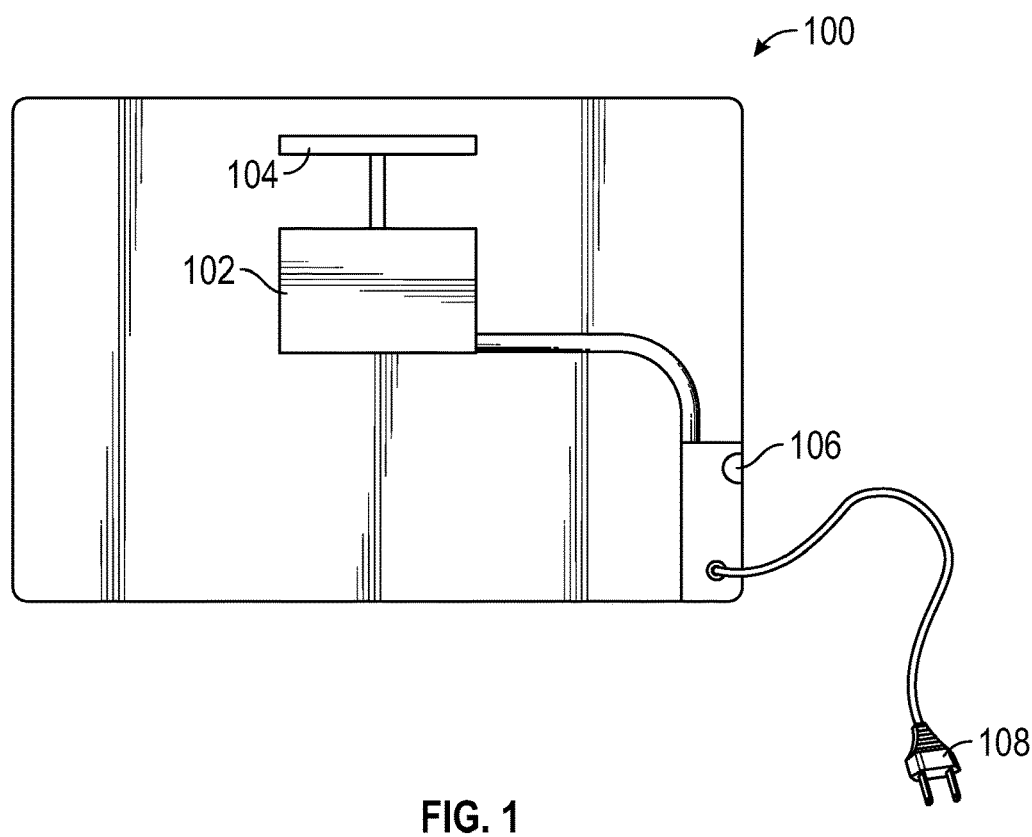
FIG. 1 illustrates a prior art generic device utilizing a universal electric motor capable of operating on AC or DC power.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

We have invented a DC power supply adapted to selectively power devices that utilize universal electric motors configured to operate on AC power. The power supply is smart in that it has the ability to recognize whether the device that is plugged into the power supply, or that is about to be plugged into the power supply, has been authorized to receive DC power for operation. In this regard, the power supply communicates with the device to detect whether the device is authorized to receive DC power. The communication can be wireless, wired, audible, magnetic, optical and/or electromagnetic, such as wireless communication, Radio Frequency Identification (RFID), near field communication, power line modulation or power line communication or the like. Alternately, the smart feature may be mechanical or electromechanical in nature, such as a key, a keyed plug, or DIP switches.

The smart power supply and the associated components in the device cooperate to create a DC power system that can energize a device having one or more universal electric motors configured to operate on AC power, so long as the device is authorized to receive DC power. A device that is not authorized will not be recognized by the smart power supply, or will be recognized as not authorized, and will not be permitted to receive DC Power from the smart power supply.

Turning now to the figures, FIG. 1 is an illustration of a generic electrical device 100 comprising a universal electrical motor 102 coupled to a load, here impeller 104. The motor 102 is wired to a switch 106 and an AC power cord 108. Device 100 is configured to operate on AC power, such as, but not limited to, 112 volt, 60 Hz power. In this regard, device 100 is intended to be representative of the myriad prior art AC equipment utilizing a universal electrical motor. Thus, for purposes of this application, the term universal electric motor will refer to a series wound, electrical motor with commutation and configured to be powered by AC power.

Although it is known that prior art devices utilizing universal electric motors, such as device 100, may operate, to varying stages of effectiveness on DC power, device 100 is rendered effectively useless when AC power is unavailable. Further, not all universal electrical motors are made the same. Some will work better than others when supplied with DC power. Some, when supplied with DC power, may overheat, underperform or otherwise present a risk to person and property.

Figure 2:
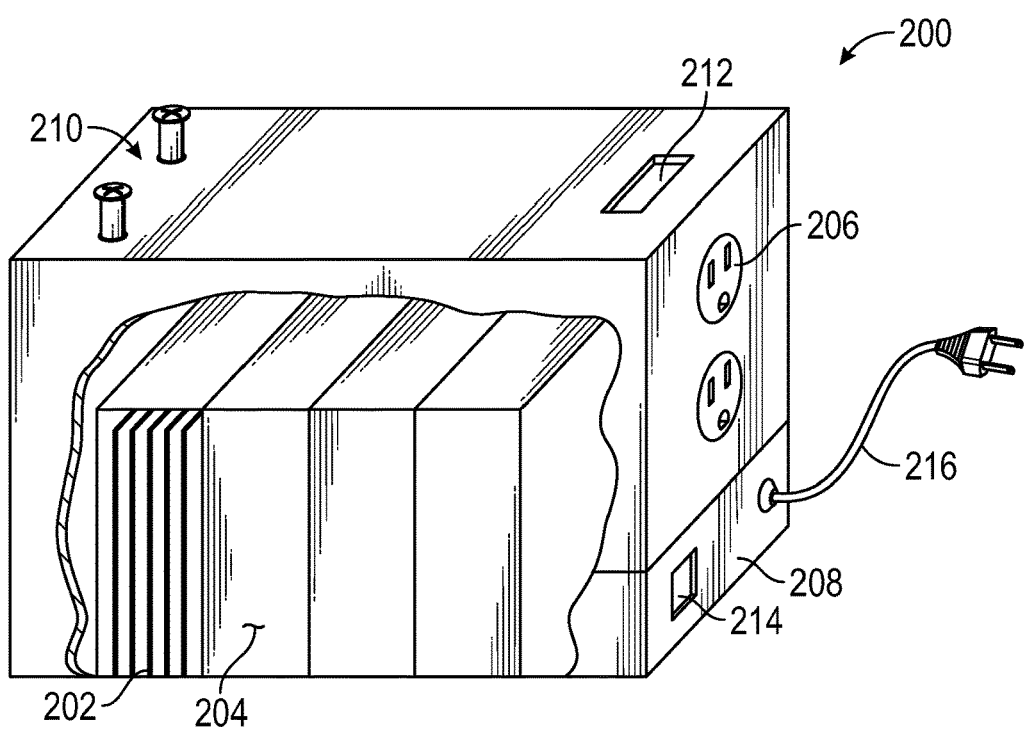
FIG. 2 illustrates a smart power supply according to the present invention.

FIG. 2 illustrates one of many possible embodiments of a smart DC power supply or power pack 200 according to the present invention. Smart power supply 200 comprises a plurality of chemical energy cells 202, preferably packaged as individual batteries 204. Smart power supply 200 may comprise one or more batteries 204, each comprising one or more cells 202. This invention contemplates use of all type of battery designs, such as, but not limited to, lithium ion batteries, lead-acid batteries, nickel-cadmium batteries, nickel-zinc batteries; and nickel metal hydride batteries. The battery type chosen for a particular smart power supply 200 preferably allows for recharging of the cells, as is known in the art.

It will be appreciated that a universal electric motor configured to run on about 110 to 120 volts (AC) or 220 to 240 volts (AC), 50 to 60 HZ AC power can be run on DC power of lower voltage. However, it is preferred for purposes of the present invention, that the DC voltage supplied by the power pack 200 range from about 35% to about 120% of the AC voltage requirements Thus, for a 120 vAC device, a smart power supply 200 according to the present invention may be configured to supply between about 42 vDC and about 144 vDC. It will be appreciated that the decision of what DC voltage to supply is a design choice based on the performance characteristics, operation environment and safety concerns for the device. For example, two 25 vDC lithium ion battery may be configured in series to provide about 50 vDC to a universal electric motor device configured to run on 120 vAC. As for the amount of current supplied, again a person of ordinary skill in the art can arrange the chemical energy sources in correct amount and order to provide the necessary power (voltage and current) to operate the universal electric motor 100 on DC power.

Also shown in FIG. 2, smart power pack 200 also may comprise one or more conventional 120 vAC outlets 206 (grounded or ungrounded) from which the DC power is supplied. It will be appreciated that the outlets 206 are sized to handle the current and voltage intended to be supplied.

FIG. 2 also shows an optional integral charging section 208 that is configured to convert AC power, such as 120 vAV, 60 Hz power, into DC power for recharging the batteries 204. It will be appreciated that the smart power pack 200 is not required to have an integral charging section 208. In such case, smart power pack 200 may have positive and negative charging buttons 210 to which a conventional battery charger (not shown) may be connected, when it is desired to recharge the batteries 204. Buttons 210 may be replaced with any manner of connector that allows the batteries to be recharged.

Lastly, smart power pack 200 preferably comprises an identity detection/validation component 212. This component is configured to control the flow of power between the power pack 200 and the universal electric motor, such as device 100. For example, and without limitation, if a device having a universal electric motor, such as a box fan (not shown), is plugged into outlet 206, no DC power will be supplied to the box fan unless the box fan satisfies the requirements of the identity detection/validation component 212.

The identity detection/validation component 212 may comprise a circuit having a radio frequency detection and/or transmission circuits, e.g., RFID, such that only devices, or portions of devices such as a device power cord, that have correct RFID characteristics can obtain power from the smart power pack 200. In addition to RFID or other wireless data transmission protocols, smart power pack 200 also may utilize an identity detection/validation component 212 comprising near field communication protocols (currently used with smart phones and other mobile devices) to identify and/or interrogate the device seeking to use the DC power from the smart power pack 200. Additionally or alternately, a power circuit 214 may be used to modulate or otherwise communicate information on the DC power signal to and/or from the device. Still further, the device's electrical signature, e.g., its noise signature, may be utilized to determine whether DC power should be supplied, or continued to be supplied to the device.

It will now be appreciated after having the benefit of this disclosure, that other identity detection/validation components 212 may be used, including, without limitation, mechanical components such as, limitation, keys, magnetic switch activation or unique power plug or connector configuration. Electro mechanical identity detection/validation components 212 may also be used including, without limitation, Dip switch settings, or any combination of the smart controls and mechanical.

A smart power supply 200 may be constructed to allow DC power to be selectively supplied to only those devices having universal electric motors that have been approved to operate on DC power.

Figure 3:
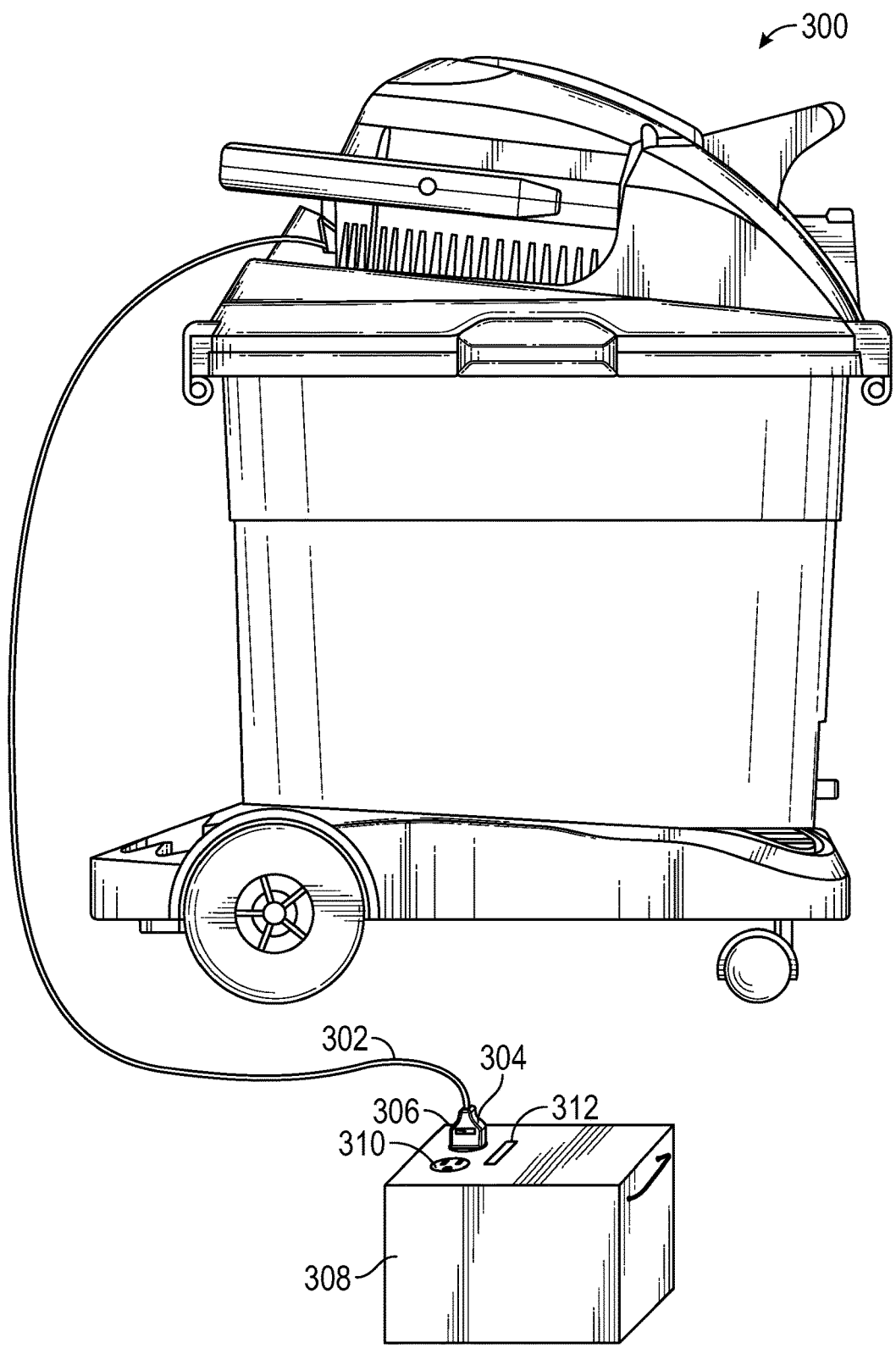
FIG. 3 illustrates a conventional wet/dry vacuum cleaner modified for use with a smart power supply according to the present invention.

FIG. 3 illustrates one of many possible embodiments utilizing aspects of the present invention. A conventional wet/dry vacuum 300 utilizing a universal electric motor (not shown), such as those available from Emerson Electric Co., has been adapted to use a smart power pack 308. The AC power cord 302 has been modified with a smart plug 304 comprising a passive RFID chip having a particular electromagnetic signature. The smart power pack 308 is configured, for example, such as described with reference to FIG. 2. This smart power pack 308 preferably comprises a plurality of lithium ion batteries configured to supply between about 40 and 120 vDC and more than 70 Watt-hours. In the particular embodiment illustrated in FIG. 3, power pack 308 comprises a mating RFID transceiver configured to interrogate the RFID chip 306 in the plug 304. When the plug 304 is brought near to the power pack 308, or plugged into the outlet/receptacle 310, the power pack identity detection/validation component 312 permits the power pack 308 to supply DC power to the plug 304/cord 302. Although RFID is used with the embodiment illustrated in FIG. 3, it will be appreciated that any one or more of the technologies discussed above may be used. Further, the plug 304, with its chip or other component, may tell the power pack identity detection/validation component 312 what voltage and/or amperage should be supplied by the smart power pack 308. As such, the smart power pack 308 may be able to supply a variety of discrete voltages and/or amperages within its range, or between about 42 and 144 vDC and more than 70 Watt-hours in this case.

Figure 4:
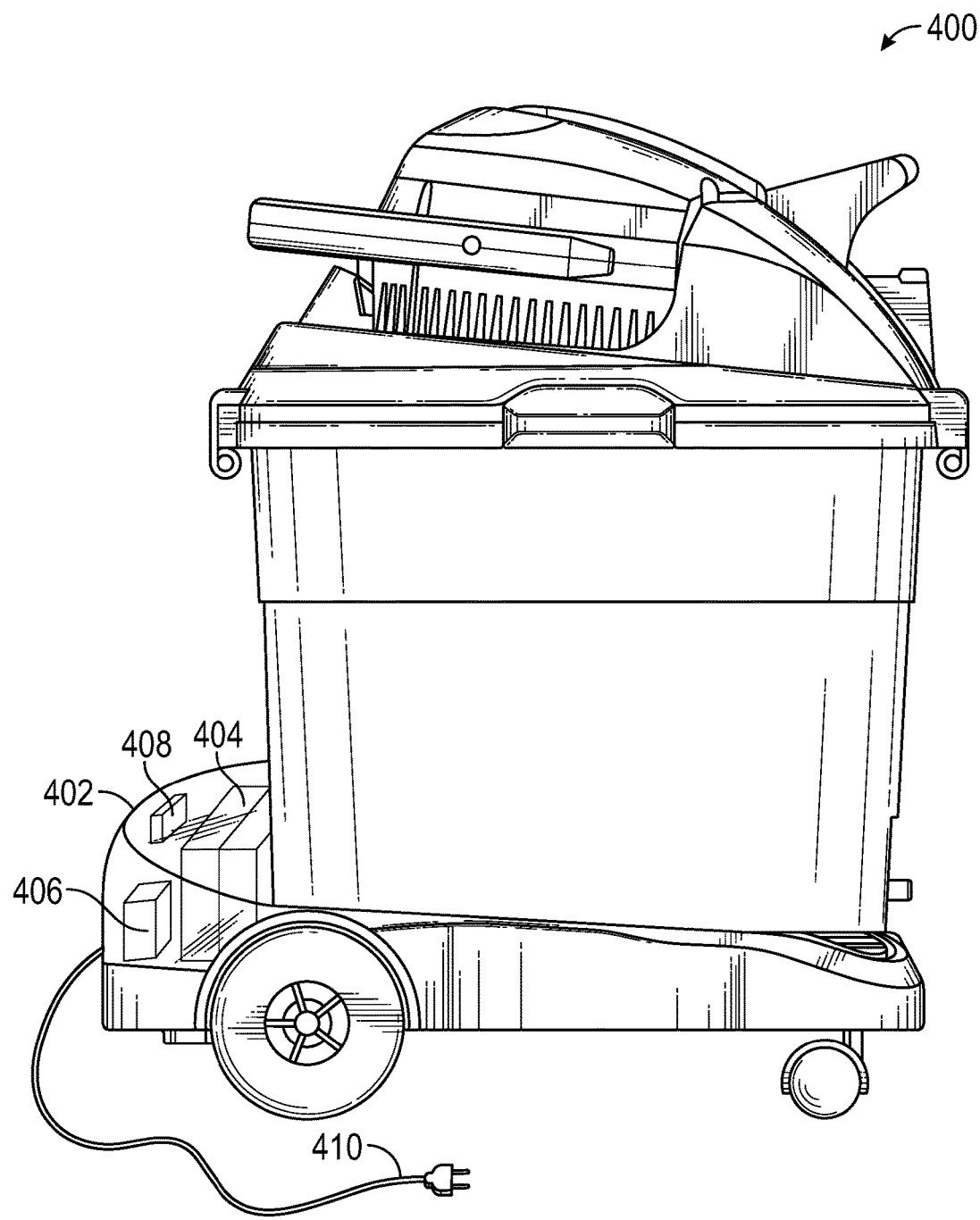
FIG. 4 illustrates an alternate embodiment of a wet/dry vacuum cleaner modified for use with a smart power supply according to the present invention.

FIG. 4 illustrates one of many possible alternate embodiments utilizing aspects of the present invention. A wet/dry vacuum 400 has been adapted to use a smart power pack 402. This smart power pack 402 preferably comprises a plurality of lithium ion batteries 404 configured to supply between about 42 and 144 vDC and more than 70 Watt-hours. The smart power pack 402 preferably also comprises a charging section 406, a controller 408, and an AC power cord 410. In operation, the vacuum 400 may be plugged into a supply of AC line power, such as a standard wall outlet (not shown) and the device 400 may be operated as usual. If the AC power is disrupted or unavailable for any reason (e.g., the cord 410 is inadvertently unplugged), the controller 408 senses the disruption in AC power and immediately (or substantially immediately) and automatically switches supply of power to the universal electric motor to the DC power supplied by the batteries 404. If AC power is restored, the controller 408 automatically switches power supplied to the motor back to AC power and recharging of the batteries is initiated, if appropriate. It is preferred in this embodiment that the smart power pack 402 be relatively integral with the device so that the power pack 402 cannot be removed and used with other devices. It will be appreciated that embodiments of the type illustrated and described in FIG. 4 may or may not utilize the identity detection/validation components 212 described above.

The various embodiments of the power pack 200, 308, 402 may include an inverter to supply AC power to those devices not approved to operate on DC power. For example, when plugged into a supply of AC line power, the power pack may supply that AC power to the device and simultaneously charge the power supply 204 or batteries 404. If the AC line power is disrupted, the power pack could continue to supply AC power to the device through the inverter from the power supply 204 or batteries 404. In this embodiment, the power pack 200, 308, 402 may operate much like a conventional uninterruptible power supply (UPS) with respect to those devices not approved to operate on DC power. However, in all embodiments, the power pack 202, 302, 402 retains many, if not all, of the other features described herein, unlike a conventional UPS.

Figure 5:
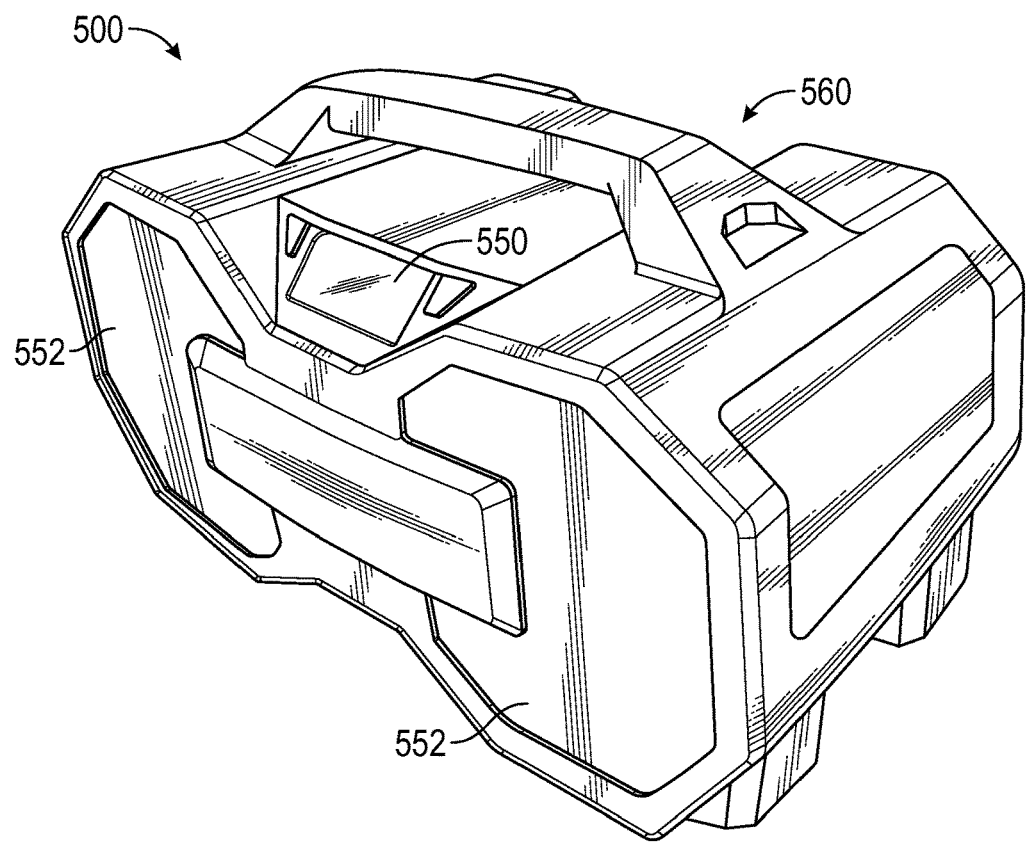
FIG. 5 illustrates an embodiment smart power supply according to the present invention.
Figure 6:
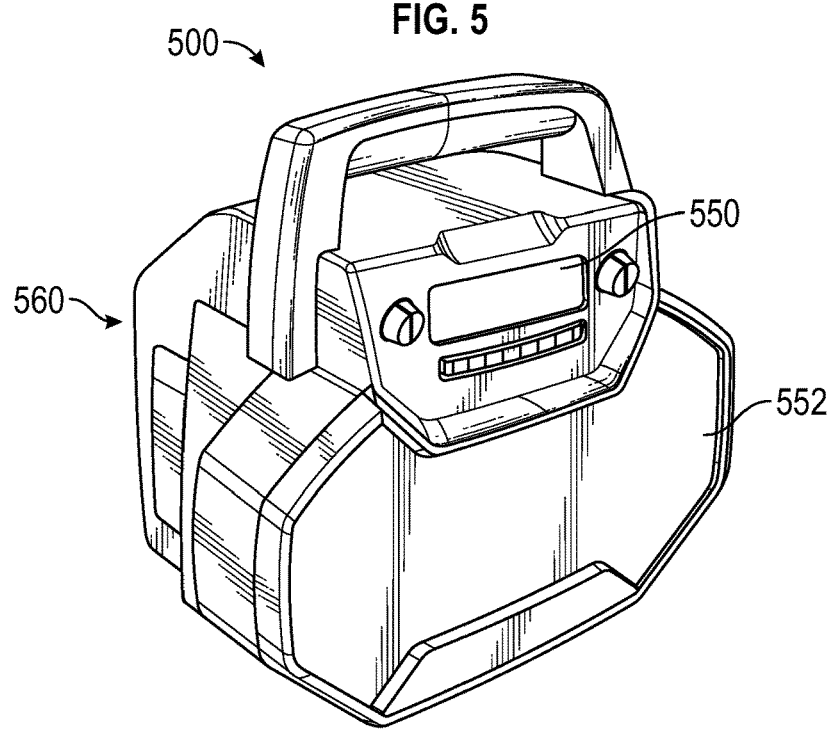
FIG. 6 illustrates an embodiment smart power supply according to the present invention.
Figure 7:
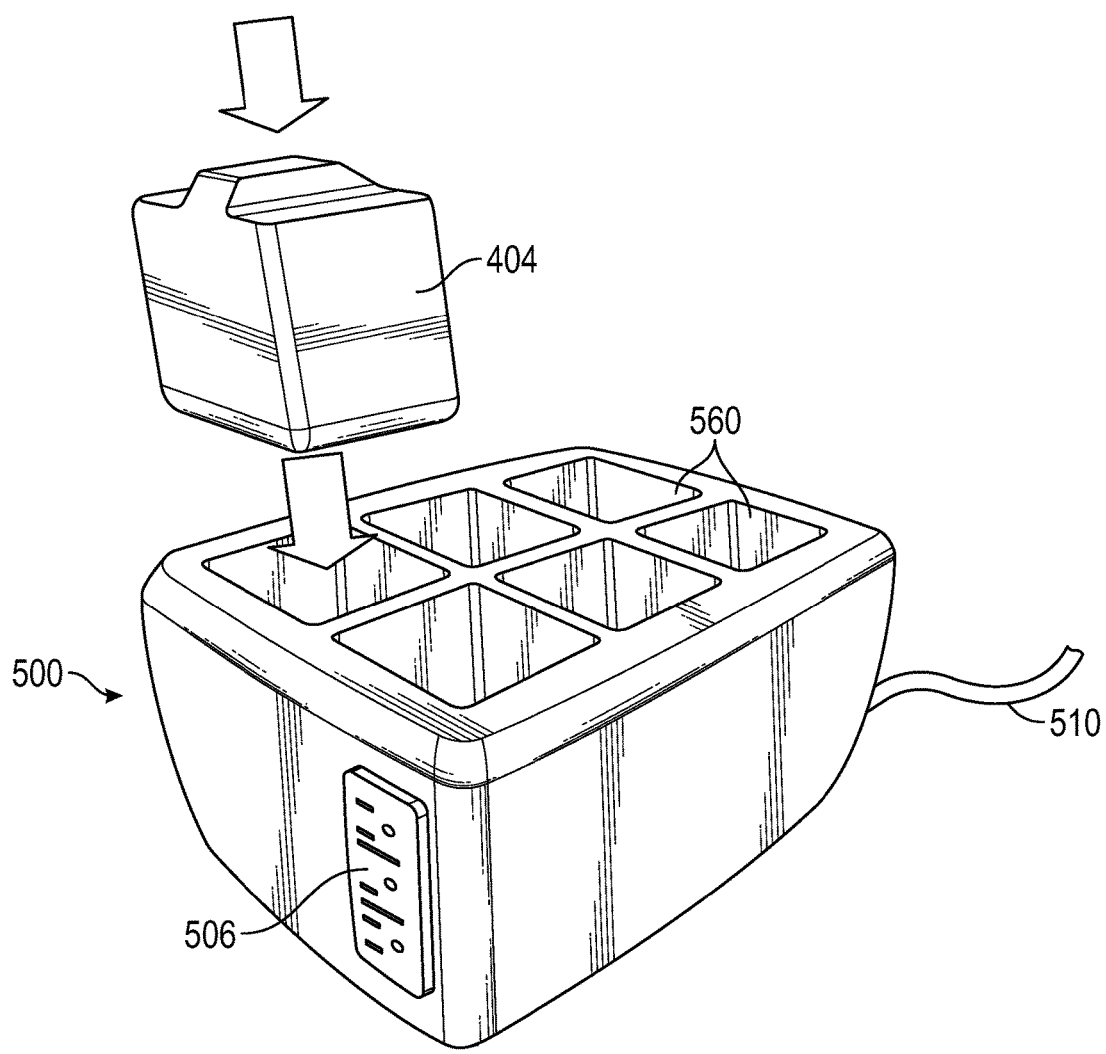
FIG. 7 illustrates an embodiment smart power supply according to the present invention.

The various embodiments of the power pack 200, 308, 402, 500 may be designed as a multi-purpose job site tool. For example, as shown in FIG. 5, FIG. 6 and FIG. 7, the power pack may include a radio 550 powered by the AC line power and/or the power supply 204 or batteries 404. Such a radio may include one or two speakers 552. The power pack may include one or more ports 560, preferably in the back of the power pack, to receive, charge, and/or receive power from the power supply 204 or batteries 404 and/or batteries for conventional cordless tools, such as the batteries for 12, 18, and/or 24 vDC cordless drills and the like. In this case, the power pack preferable includes circuitry to determine at what voltage any such battery should be charged. Alternatively, the power pack may rely on the physical structure of the batteries for determining at what voltage any such battery should be charged, and include multiple charging ports 560, one or more for each of 12, 18, and 24 vDC batteries.

The various embodiments of the power pack 200, 308, 402, 500 may also be daisy-chained together to maximize power available to be supplied to the load. For example, the various outlets/receptacles 206, 310, 506 and inlets/cords 210, 216, 410, 510 may be connected to other inlets and outlets of other power packs to increase power capacity. Thus, the various embodiments of the power pack 200, 308, 402, 500 may detect when they are connected to an identical pack, or another embodiment thereof, using the identity detection/validation components described above. Further, the various outlets/receptacles 206, 310, 506 may also be configured to receive power to charge the batteries and/or pass power through in such a daisy chain arrangement. Likewise, the various inlets/cords 210, 216, 410 may also be configured to supply power to the load and/or pass power through in such a daisy chain arrangement.

Where the power pack includes the port(s) 560 described above, the power is supply 204 or batteries 404 may not be internal to the power pack, and may in fact be the removable batteries designed for use with conventional cordless tools.

In this case, the circuitry within the power pack may selectively wires these removable batteries in series or parallel in order to provide the required voltage and amperage. Alternatively, or additionally, the circuitry within the power pack may include step-up and/or step-down voltage converters in order to provide the required power to the power outlet. Such converters may provide stable, essentially constant, output voltage and/or power, with variable input or stored voltage or power.

The various embodiments of the power pack 200, 308, 402 may also include a pulse width modulator (PWM) to automatically (or manually through user input) adjust the power provided to the device. Such adjustment may be done in order to accommodate the limitations of the device. Alternatively, such adjustment may be done in order to maximize run-time given the limited capacity of the power supply within the power pack 200, 308, 402. For example, as the power available in the power supply decreases, the power provided to the device may be decreased in order to maximize run-time of the device.

Other and further embodiments utilizing one or more aspects of the inventions described above can be devised without departing from the spirit of Applicant's invention. For example, the power pack 402 may be designed for use with a variety of devices, and as such include the identity detection/validation components 212 so that it can detect when and what voltage to supply to each of those devices. It will also be appreciated that the power packs described herein may be configured to deliver other combinations of voltage, amperage (amp-hours), and/or wattage (watt-hours).

Figure 8:
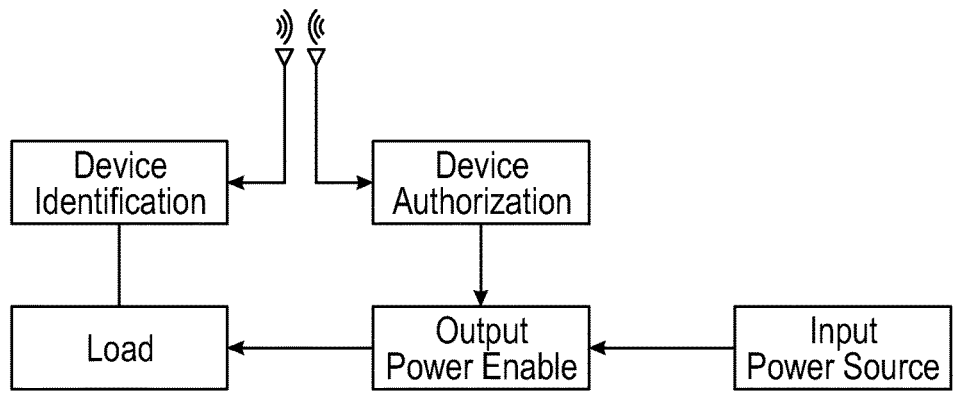
FIGS. 8-12 illustrate various functions of a smart power supply according to the present invention.

Turning now to FIG. 8, a basic operation is described. A device identification module is associated with a load. A device authorization module is associated with a power pack of the present inventions. When in contact, or close enough, the device identification module and device authorization module communicate with one another to confirm that the load is authorized to receive DC power, as well as learn other characteristics and capabilities of the load, such as input voltage requirements. If such communications do not occur, the power pack presumes that the load is not authorized to receive DC power, or is not connected. If the load is connected, power output is enabled, such that power from the power source is supplied to the load. If the load is authorized to receive DC power, the power supplied to the load may be DC power. If the load is not authorized to receive DC power, the power supplied to the load may only be AC power if available.

Figure 9:
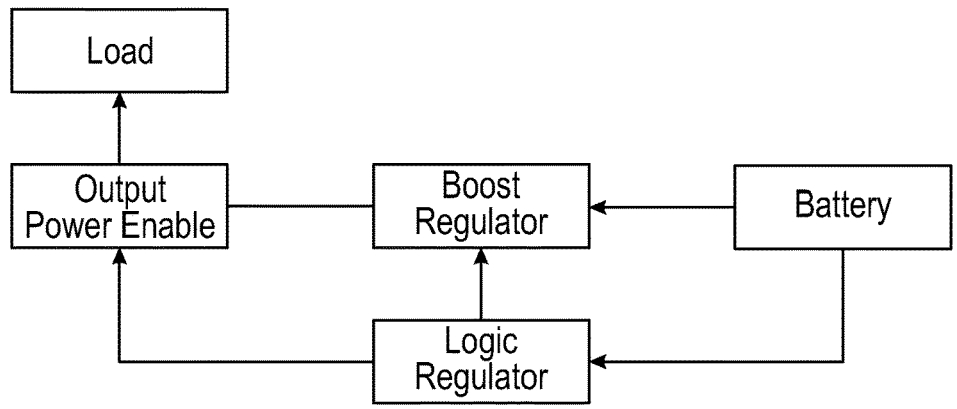

Turning now to FIG. 9, a power boost operation is described. Should the load require a higher voltage than is stored in the battery(ies), the output power to the load is boosted. Specifically, as shown, a regulator uses logic and/or other circuitry to boost the voltage from the battery to output to the load.

Figure 10:
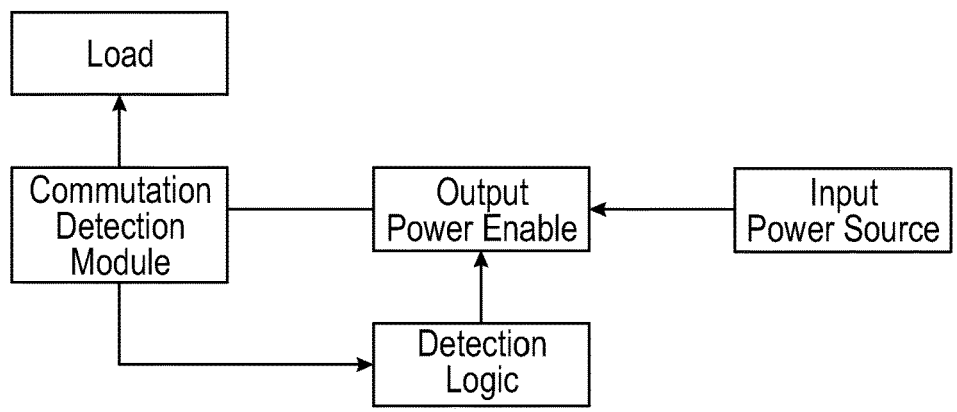
Figure 11:
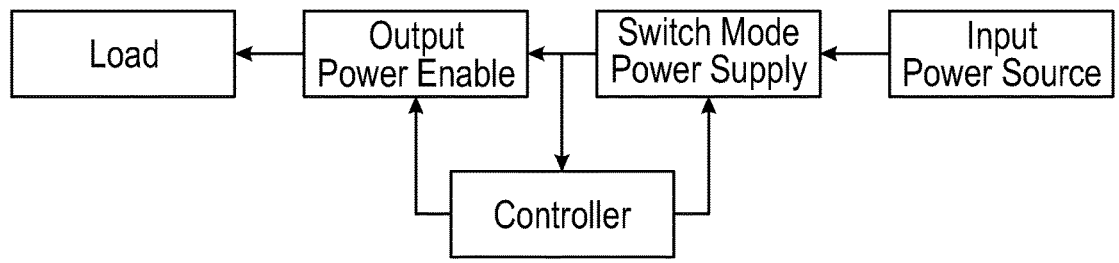

Turning now to FIG. 10, a commutation detection operation is described. The load need not include a specific device identification module. Rather, the identity detection/validation component, of the power pack, may simply detect characteristics of the load. For example, when the device/load is connected to the power pack, the identity detection/validation component may function as a commutation detection module and attempt to detect the commutation of the load. If the device is detected to be a commutated, series-wound motor, through detection logic of the identity detection/validation component, the device load is determined to be authorized to receive DC power and the power supplied to the load may be DC power. If the device is detected to be a commutated, series-wound motor, the load is determined to not be authorized to receive DC power and the power supplied to the load may only be AC power if available.

Figure 12:
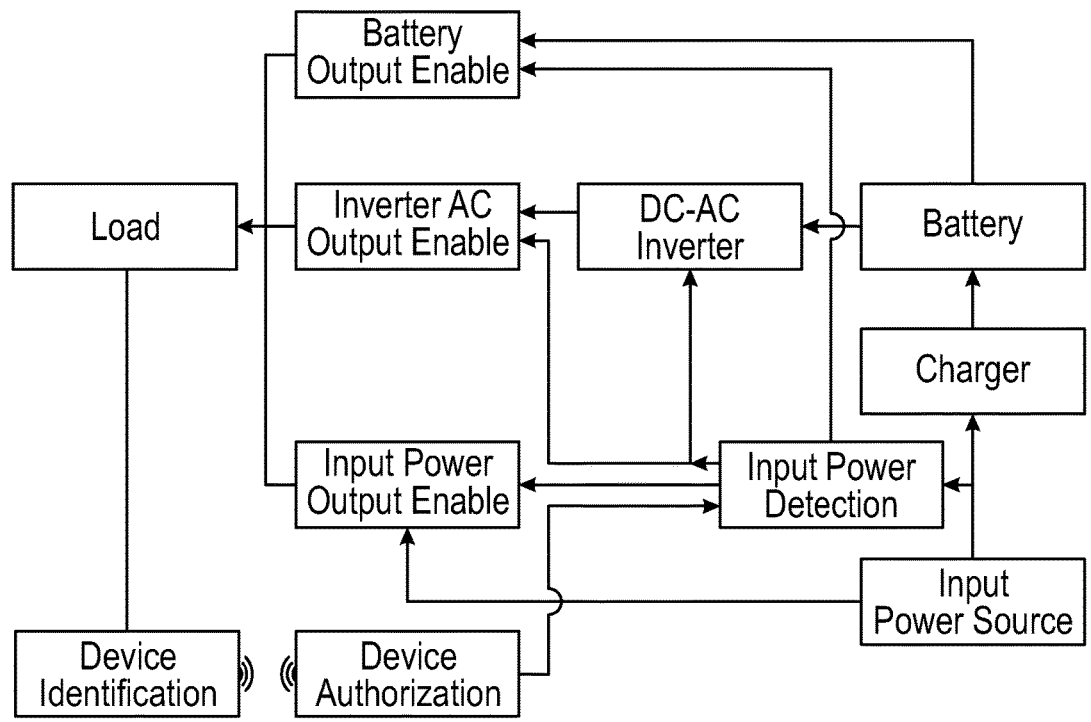

Turning now to FIG. 12, an advanced operation is described. Any embodiment many include one or more of the features described with reference to FIG. 12. As with FIG. 8, the device identification module and device authorization module communicate with one another to detect whether that the load is authorized to receive DC power.

If the load is authorized to receive DC power, the power supplied to the load may be either AC power or DC power. If AC line power is detected by an input power detection module, then that AC line power is preferably output to the load. That AC line power may also be used to charge the battery(ies), through a charger. If AC line power is not detected by the input power detection module, then DC power from the battery is output to the load. Should AC line power be detected by the input power detection module, the power pack stops supplying DC power to the load and starts supplying the AC line power to the load. Likewise, should the AC line power cease to be detected by the input power detection module, the power pack stops supplying the AC line power to the load and starts supplying DC power to the load.

If the load is not authorized to receive DC power, the power supplied to the load will be AC power. If AC line power is detected by an input power detection module, then that AC line power is preferably output to the load. That AC line power may also be used to charge the battery(ies), through a charger. If AC line power is not detected by the input power detection module, then DC power from the battery is inverted by the inverter module and then output to the load as AC power. Should AC line power be detected by the input power detection module, the power pack stops inverting DC power for the load and starts supplying the AC line power to the load. Likewise, should the AC line power cease to be detected by the input power detection module, the power pack stops supplying the AC line power to the load and starts inverting DC power for the load.

The power pack of the present inventions may also be configured to detect a bad or damaged device or load. For example, if the identity detection/validation component is not able to determine whether the load is authorized to receive DC power, such as through the lack of authentication/identification/authorization or faulty communications, the power pack may simply not provide power at all to the load. As another example, should the load draw a higher than normal, or higher than specified in the device characteristics learn through communications with the device, the power pack may stop providing power to the load.

Further, the various methods and embodiments of the methods of manufacture and assembly of the system, as well as location specifications, can be included in combination with each other to produce variations of the disclosed methods and embodiments. For example, while the inventions of the present invention have been described in terms of embodiments, each embodiment may include any or all the features of a different embodiment. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. An apparatus comprising:
   a chemical-to-electrical power source configured to supply DC power;
   a power outlet coupled to the power source and configured to receive an AC power plug coupled to a device; and
   an authorization detection component configured to—
      communicate with the device to detect whether the device is authorized to receive DC power, based on electrical characteristics of the device,
      if the device is authorized to receive DC power, permit the power outlet to supply the DC power from the chemical-to-electrical power source to the device via the AC power plug, and
      if the device is not authorized to receive DC power, prevent the power outlet from supplying the DC power from the chemical-to-electrical power source to the device.

2. The apparatus of claim 1 further including a power inlet configured to receive power from another apparatus, in a daisy-chain configuration, such that the apparatuses together are operable to supply more power than either apparatus alone.

3. The apparatus of claim 1 wherein the authorization detection component is configured to communicate with the device through RFID communications to detect whether the device is authorized to receive DC power.

4. The apparatus of claim 1 wherein the authorization detection component is configured to communicate with the device through NFC communications to detect whether the device is authorized to receive DC power.

5. The apparatus of claim 1 wherein the authorization detection component is configured to communicate with the device through bluetooth communications to detect whether the device is authorized to receive DC power.

6. The apparatus of claim 1 wherein the authorization detection component is configured to communicate with the device through wireless communications to detect whether the device is authorized to receive DC power.

7. The apparatus of claim 1 wherein the authorization detection component is configured to detect whether the device includes a commutated electric motor.

8. The apparatus of claim 1 further including a charging circuit configured to accept AC line power and charge the power source with the AC line power.

9. The apparatus of claim 8 wherein the charging circuit is further configured to detect the presence of AC line power and supply the AC line power to the device through the power outlet when the presence of AC line power is detected.

10. The apparatus of claim 8 further configured to automatically supply DC power to the device if the AC line power is lost.

11. The apparatus of claim 8 further configured to supply the AC line power to the device if the device is not authorized to receive DC power.

12. The apparatus of claim 1 further configured to supply AC power to the device if the device is not authorized to receive DC power.

13. The apparatus of claim 12 wherein the AC power is AC line power.

14. The apparatus of claim 12 wherein the AC power is inverted DC power from the power source.

15. The apparatus of claim 12 wherein the AC power is AC line power, when AC line power is available, and wherein the AC power is inverted DC power from the power source, when AC line power is not available.

16. The apparatus of claim 1 further including the device, wherein the device includes the AC power plug.

17. The apparatus of claim 16 wherein the AC power plug includes an RFID tag, which the authorization detection component is configured to interrogate in order to detect whether the device is authorized to receive DC power.

18. The apparatus of claim 16 wherein the AC power plug is physically keyed, such that the AC power plug is operable with conventional wall receptacles and also operable with both the power outlet and the authorization detection component.

19. The apparatus of claim 16 wherein the AC power plug includes a validation component operable with the authorization detection component in order to validate that the device is authorized to receive DC power.

20. The apparatus of claim 1 wherein the authorization detection component is configured to communicate with the device optically to detect whether the device is authorized to receive DC power.

21. The apparatus of claim 1 wherein the authorization detection component is configured to communicate with the device magnetically to detect whether the device is authorized to receive DC power.

22. The apparatus of claim 1 wherein the authorization detection component is configured to communicate with the device through audible communications to detect whether the device is authorized to receive DC power.

23. The apparatus of claim 1 further configured to provide a constant regulated DC voltage output despite variable input voltage.

24. The apparatus of claim 1 further configured to provide a constant regulated DC voltage output despite variable input power.

25. The apparatus of claim 1 further configured to provide a regulated DC voltage output despite variable stored power.

26. A system comprising:
   a device comprising a universal electric motor configured to operate on AC power;
   an AC power cord operatively couple-able to the motor and comprising a plug for transferring power from a power source to the device, the plug comprising a first portion of an authorization component;
   a DC power supply comprising—
      a second portion of the authorization component;
      a chemical-to-electrical power source; and
      a power outlet coupled to the power source and configured to receive the plug,
      the power supply configured to supply DC power to the device via the AC power cord only when the first portion of the authorization component communicates with the second portion of the authorization component thereby indicating that the device is authorized to receive DC power, based on electrical characteristics of the device.

27. A method of supplying DC Power to an AC device, comprising:

providing a device comprising a universal electric motor configured to operate on AC power, the device having an AC power cord operatively coupled to the motor and comprising a plug for transferring power from a power source to the device, the device further including a first portion of an authorization component;

providing a DC power supply comprising a chemical-to-electrical power source and a second portion of the authorization component, the power supply having a power outlet configured to receive the device plug; and configuring the power supply to supply DC power to the device via the device plug only when the first portion of the authorization component communicates with the second portion of the authorization component thereby indicating that the device is authorized to receive DC power, based on electrical characteristics of the device.

* * * * *